INVENTORS
DONALD R. CHURCH
MIGUEL C. JUNGER

INVENTORS
DONALD R. CHURCH
MIGUEL C. JUNGER
BY
ATTORNEY

June 30, 1964  D. R. CHURCH ETAL  3,139,603
MASS-LOADED ELECTROMECHANICAL TRANSDUCER
Filed Dec. 29, 1960  3 Sheets-Sheet 3

INVENTORS
DONALD R. CHURCH
MIGUEL C. JUNGER
BY
ATTORNEY

United States Patent Office 3,139,603
Patented June 30, 1964

3,139,603
MASS-LOADED ELECTROMECHANICAL
TRANSDUCER
Donald R. Church, Los Altos, Calif., and Miguel C. Junger, Cambridge, Mass., assignors to Acoustica Associates, Inc., Los Angeles, Calif., a corporation of New York
Filed Dec. 29, 1960, Ser. No. 79,197
4 Claims. (Cl. 340—10)

This invention relates to electromechanical transducers, and more particularly to radial resonance type hollow cylindrical transducers of unusually small diameter, relative to a given resonance frequency, and which have improved efficiency of operation and economy of electromechanical transducer material.

Hollow cylinder electromechanical transducers of the radial resonance type are known in the art. If one designates the wall thickness of such a hollow cylinder by "$t$" and the mean diameter by "$D$," it can be shown that, for a given transducer, the radial resonance frequency is inversely proportional to "$D$" and the Q-factor is proportional to "$t$." The "Q" of a standing wave system, which defines the sharpness of the resonance peak, is equal to the amplification at resonance and also to the reciprocal of the ratio: $\Delta f/f_n$, where "$f_n$" is the natural frequency of resonance of the system in the mode under consideration, and "$\Delta f$" is the bandwidth between the points above and below the resonance peak at which the total energy in the sytsem is half the energy at resonance.

Radial resonance occurs when the mean circumference of the cylinder is one wavelength at the operating frequency, and is thus dependent upon the velocity of sound in, that is, the "bar velocity" ($\sqrt{E/\rho}$; where $E=$Young's modulus and $\rho=$density) of the material of which the transducer is made. Thus, if we consider that, of the well-known piezoelectric ceramic materials, ordinary barium titanate has a bar velocity of about 15,000 feet per second, while lead zirconate titanates have a considerably lower bar velocity, it is apparent that, for a given frequency, radial resonance can be achieved with a smaller mean diameter cylinder of lead zirconate ceramic than of barium titanate ceramic.

When it is sought to reduce the operating frequency of such hollow cylindrical transducers, the mean diameter D becomes impracticably large. In the case of piezoelectric ceramic materials it is not practical to cast a one-piece cylindrical shell larger than approximately six or eight inches in mean diameter. Shells of larger mean diameter are commonly made up of staves of piezoelectric ceramic which are silvered and polarized on their radial surfaces, and these staves are cemented together to form the cylindrical shell. This technique allows any size cylinder to be made with good control of diameter and wall thickness. In addition, the individual staves are driven, in operation, in a thickness mode, which gives high efficiency and output. When the staves are so driven, the entire cylinder expands and contracts radially, so that the shell retains its character as a radial mode resonator.

Notwithstanding that the stave assembly technique permits the construction of large cylindrical shells, the problems of unwieldy size at lower frequencies remain. These include the problem of mounting a large shell, and the problem of handling it, as well as the problems of making it and storing it. Furthermore, the amount of electromechanical transducer material which is used in cylindrical shell transducers is usually more than is required to achieve a given power handling capability.

It is a general object of the present invention to improve the stave-type cylindrical shell construction of radial-mode resonance transducers. It is another object of the invention to provide an improved construction which simultaneously achieves radial resonance at lower frequencies with a given mean diameter, and reduction to an optimum minimum quantity of the amount of electromechanical transducer material used in a given structure. A further object of the invention is to provide such an improved construction in which the mean diameter D and the shell thickness $t$ can be independently adjusted, in order to afford independent adjustment of the radial-mode resonance frequency and the Q-factor. A still further object of the invention is to provide such an improved construction which can be operated while submerged in water at great depths, with only the outer surface of the shell subjected to water pressure, in which the ratio of D to $t$ can have a wider latitude than in a cylinder made of transducer material alone, thereby preserving under such operating conditions the opportunity for independent adjustment of the operating frequency and the Q-factor.

A still further object of the invention is to provide mounting and supporting means for cylindrical shell transducers of the stave type in which the outer cylindrical surface is free for coupling with water and the ends of the staves are substantially free from motional restriction. Another general object of the invention is to provide a stave-type cylindrical shell transducer construction having the foregoing objects and features which is rugged, straightforward in design and devoid of complicated assembly requirements, and able to be made waterproof for use when submerged in a liquid.

The foregoing objects and features are generally achieved according to the invention by providing a cylindrical shell vibrator made up of a first plurality of staves of electromechanical transducer material and a second plurality of staves of electromechanically passive material, members of said second plurality alternating with members of said first plurality, all of said staves terminating in a common outer cylinder surface, and electrical connections to said staves of electromechanical transducer material. Mass loading of the resonator, to reduce its natural frequency of radial-mode resonance vibration, is achieved by providing mass-loading members attached to said staves of electromechanically passive material. Preferably, this is accomplished by providing staves of said second plurality which are T-shaped in cross section, and employing the stem portion of the T of each as a stave between members of the first plurality, with the cross portion of the T of each stave of the second plurality disposed within the shell lying in the locus of a second concentric shell of smaller diameter. In transducers employing piezoelectric ceramic as the electromechanical transducer material, the piezoelectric staves are electroded on their radially disposed sides and polarized between the electroded sides to operate as thickness mode vibrators between said sides, and the electromechanically passive staves are a metal, such as steel or brass, preferably the latter, and are simultaneously employed as electrodes; in such structures even-number groups (i.e., two, four, etc.) of staves of piezoelectric staves are employed between successive pairs of passive staves, and are polarized in alternate circumferential directions, so that one electrode between two piezoelectric staves can serve both; preferably in such a construction the passive metallic staves are grounded in an operating circuit, and the conductors for the electrodes on the piezoelectric elements are disposed within the cylindrical shell. The staves of a given transducer are all of the same axial length, and the mounting means provided comprises an inner rigid member to which are mounted end members extending radially substantially to the outer cylinder surface overlying the ends of the staves, and resilient material, which may include pressure-release material, is disposed between each end member and the confronting ends of the staves, to support the transducer without restricting radial motion of the staves at their ends. Waterproof housing means includes an envelope surrounding the shell at the outer cylinder surface and attached to the outer periphery of each end member of the supporting means. Two or more such cylindrical structures can be collinearly supported between two end members to afford an assembly which radiates sound in directions transverse to the cylinder axis, and, if desired, the direction of such radiation can be altered by connecting the cylindrical structures into an operating system via phase lag or lead networks.

Other and further objects and features of the invention will become apparent from the following description of certain specific embodiments thereof. This description refers to the accompanying drawings, wherein.

Figure 1:
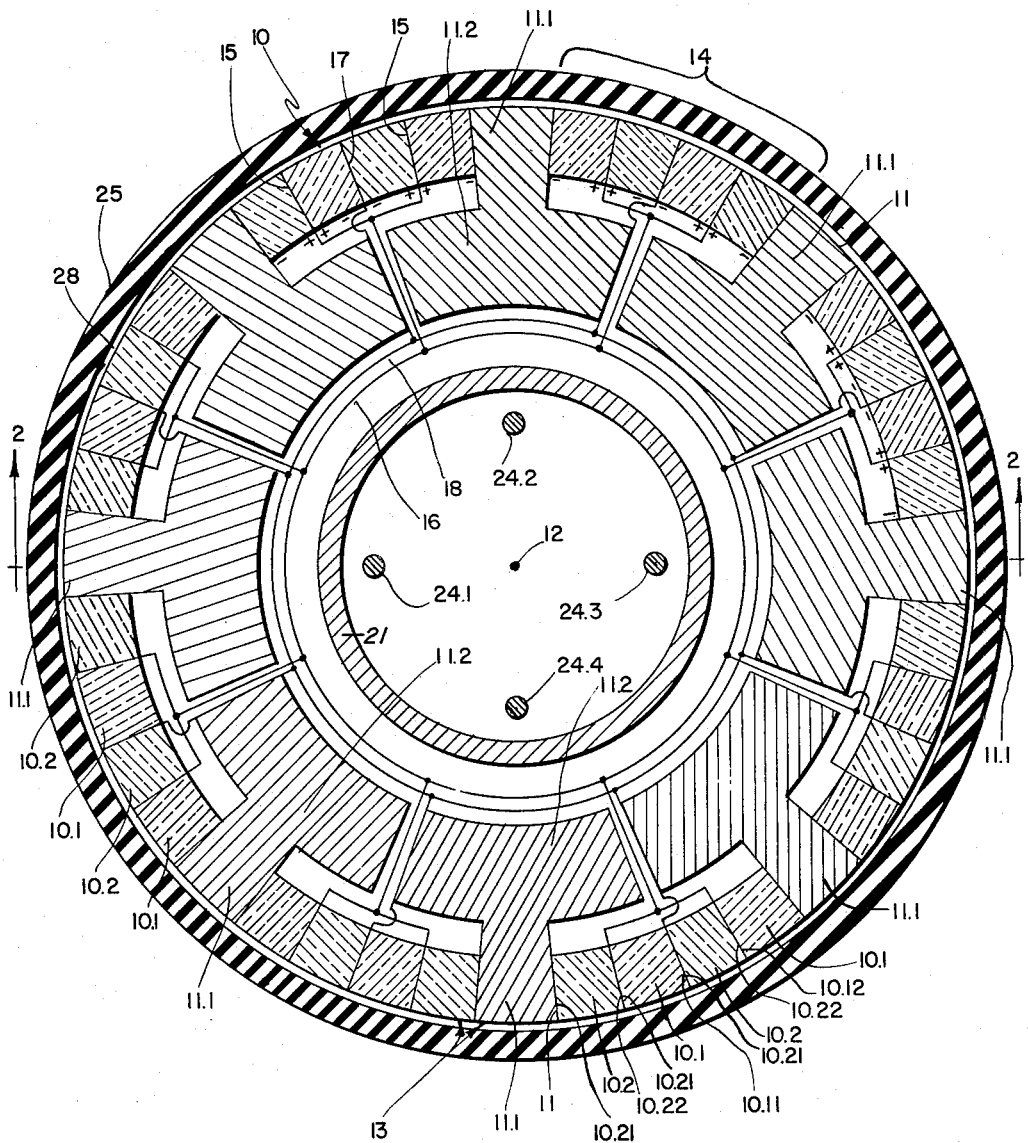
FIG. 1 is a diametrical cross section of an embodiment of the invention taken along the line 1—1 of FIG. 2.
Figure 2:
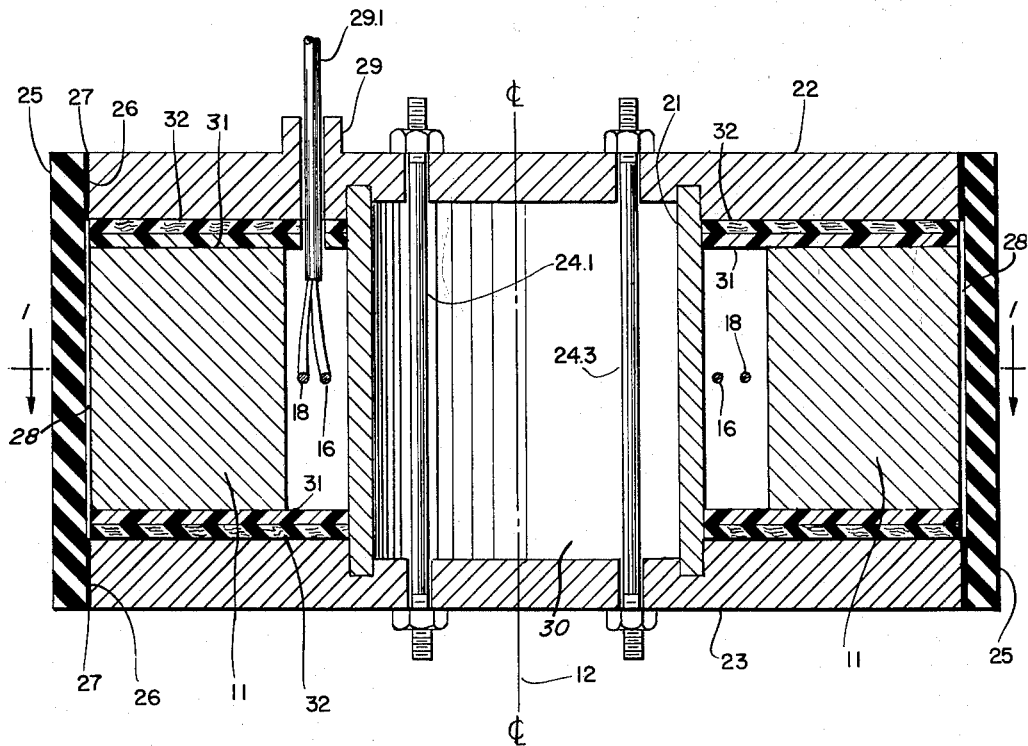
FIG. 2 is a vertical section taken along line 2—2 of FIG. 1.

Referring to FIGS. 1 and 2, a cylindrical shell vibrator 10 comprises a first plurality of staves 10.1 and 10.2 of piezoelectric ceramic material (e.g., barium titanate, or lead zirconate titanate according to Patent No. 2,708,244) and a second plurality of staves 11 of solid metal (e.g., steel or brass) arrayed in a circle about a common axis 12 and all terminating in a common outer cylinder surface 13. The piezoelectric staves 10.1 and 10.2 are arranged in groups 14 of four staves each, and these groups alternate with the metal staves 11. Each metal stave 11 is T-shaped in cross section, and has a stem portion 11.1 and a cross portion 11.2. The stem portions 11.1 are disposed between piezoelectric ceramic staves and the cross portions 11.2 are disposed within the shell 10.

The piezoelectric staves 10.1 and 10.2 are polarized between their radially directed faces 10.11, 10.12 and 10.21, 10.22, respectively, and are adapted to vibrate as expanders between such faces in the circumferential direction relative to the shell 10. The staves in each group 14 are alternatively reversely polarized; that is, the positive (+) faces 10.12 and 10.22 of the piezoelectric staves 10.1 and 10.2 are arranged in pairs which confront each other, and the negative (—) faces 10.11 and 10.21 likewise confront each other in pairs. The outermost surfaces 10.11 and 10.21 of the members of any group 14 are negative (—) and confront radial surfaces of the stem portions 11.1 of the metal staves 11. The metal staves 11 thus can function as ground electrodes for the piezoelectric staves. Positive (+) electrodes 15 are provided between each pair of confronting positive (+) faces 10.12 and 10.22, and these are all connected in parallel to a positive (+) bus 16. A negative electrode 17 is connected between the intermediate pair of negative (—) faces 10.21 and 10.11 of each group 14, and these negative electrodes are connected to adjoining cross portions 11.2 of the metal staves 11, and thence to a negative (—) bus 18. The busses 16 and 18 are circular in form, and are disposed within the shell 10. If only two piezoelectric staves 10.1 and 10.2 are required to comprise an even-numbered group 14, there will be only one set of confronting positive (+) faces 10.12 and 10.22 and each negative (—) face 10.11 or 10.21 of the group will confront a metal stave 11, and only one positive electrode 15 will be used per group 14. The provision of even-numbered groups of piezoelectric staves between the metal staves facilitates the making of electrical connections, but is obviously not the only possible structure. Single staves or odd-number groups of staves of piezoelectric material can be used alternating with the passive staves 11, if desired. If a single piezoelectric stave is used between two metal staves 11, then the metal staves will alternately be in opposite sides of the signal line. A stuffing tube 29 is provided in one end cap 22 for the passage of a signal cable 29.1, connected to the busses 16 and 18.

The staves are cemented together at their radially disposed faces by means of any suitable cement (not shown), to form a unitary cylindrical shell vibrator 10 made up in part of electromechanical transducer material (staves 10.1 and 10.2) and in part of electromechanically inert material (metal staves 11). This shell is supported by a rigid structure comprising an inner axially disposed member in the form of a tube 21 to which end plates 22 and 23 are fastened by means of elongated bolts 24.1, 24.2, 24.3 and 24.4 extending in the axial direction. The end plates 22 and 23 are circular disc-shaped and extend substantially to register at their peripheries 26 with the outer cylinder surface 13 of the shell 10. A watertight protective sheath 25, which may be neoprene or "$\rho c$" (relative to water) rubber, as shown, or alternatively may be a thin metal shell (see FIG. 3) covers the entire outer cylinder surface 13 and the outer peripheral surfaces 26 of the end plates 22 and 23, and is fastened to these peripheral surfaces 26, as by means of a suitable cement 27. As another alternative, a thin stainless steel shell (not shown) may cover the rubber sheath 25, in order to provide further protection for the shell 10. The space 28 between the outer cylinder surface 13 and the sheath 25 may be filled with an oil (not shown). The interior 30 of the shell, containing the cross portions 11.2 of the inert staves 11, wiring and busses 16 and 18, axial support member 21 and bolts 24, is air or gas filled.

In order to function efficiently, for example in water, the shell 10 is mounted so that only the outer surface 13 is exposed to the water load. The inner surface of the shell is pressure released, as by exposure to air or other gas as is stated above, and the edges, that is the ends of the staves 10.1, 10.2 and 11 are substantially not restrained. The end plates 22 and 23 are preferably made of heavy steel and the tube 21 is stiff to support axial hydrostatic pressure, and the vibrator shell 10 essentially "floats" (from an acoustic point of view) between, for example, nylon and "Corprene" washers 31 and 32, respectively, so that the shell is free to vibrate radially. The nylon washers 31 are resilient, and the Corprene constituting the washers 32 is a pressure-release material. Other suitable materials may be used, if desired. The shell 10 itself supports the radially compressive forces of a water load, owing to its arch-like structure in which the staves are each somewhat wedge-shaped and all joints are on radially directed surfaces. The ratio of mean cylinder shell diameter to shell thickness is thus limited by the maximum compressive stress of the staves having the lower value of compressive stress.

The metal staves 11 serve a number of functions in the design of the transducer shown in FIGS. 1 and 2. Being in the shell 10 itself, they constitute an element of the principal vibrator, although the metal itself is only passive, since it is not capable, in this structure, of functioning as an electromechanical transducer material. The length ratio of ceramic (piezoelectric transducer material) to metal (electromechanically passive) along the mean circumference of the shell 10 is chosen to reduce the amount of ceramic material to the minimum which is required to operate the completed transducer at the required power level. As is mentioned above, a shell made entirely of piezoelectric ceramic has more of such material than is required in practice for any power level the shell is otherwise capable of sustaining. A useful ratio is two parts ceramic to one part metal. Further, since metal is a better conductor of heat than ceramic, the stave stems 11.1 conduct heat away from the ceramic staves to surrounding water (through the sheath 25) faster than the heat would normally flow away if all the staves were ceramic. Heat also flows to the relatively more massive cross portions 11.2 where, if desired, arrangements (not shown) can be provided to remove heat.

The cross portions 11.2 of the metal staves 11 are mass-loading blocks, which serve to lower the resonance frequency of a given shell 10, or, conversely, to reduce the magnitude of the mean diameter D of the shell required to achieve a given resonance frequency. These mass-loading blocks are actually part of the metal in the shell itself, but may be considered as separate masses.

When the cylindrical shell 10 is driven at its radial resonance all motion is in a radial direction. Therefore, in computing the resonance frequency of the shell the effective acoustic velocity (i.e., the "bar velocity") in the outer shell 10 must be determined. The acoustic velocity in the shell of one material is given by the equation:

$$C = \sqrt{\frac{E}{\rho}} \quad \text{(Relation 1)}$$

where:

$C$ = acoustic velocity,
$E$ = Young's modulus for the material, and
$\rho$ = density of the material.

In the mass-loaded shell the value for the equivalent Young's modulus is taken as the weighted average of that for the ceramic material 10 and for the metal 11. This is found in the equation:

$$E_e = \frac{E_c E_b}{x E_b + (1-x) E_c} \quad \text{(Relation 2)}$$

where:

$E_e$ = the equivalent Young's modulus,
$E_c$ = Young's modulus of the ceramic,
$E_b$ = Young's modulus of the metal, and
$x$ = ratio of ceramic to total shell circumference.

The density figure to be used in Relation 1 for computing the acoustic velocity in the composite shell of FIGS. 1 and 2 is the apparent density obtained if all of the mass in both the outer shell and the inner mass-loading elements 11.2 is assumed to be concentrated in the outer shell. Thus it is the ratio of the volume of the outer shell only (ceramic staves 10.1 and 10.2 and stem portions 11.1 of the metal staves 11) to the total mass in the vibrator configuration. This illustrates that the acoustic velocity circumferentially in the composite shell can be controlled by changing the mass of the loading blocks. Therefore, for a given mean shell diameter and outer shell thickness, the acoustic velocity and consequently the radial resonance frequency can be controlled by changing the mass of the loading blocks inside the shell. Brass is preferred over steel as the metal for the passive staves 11 because brass is more dense and has a lower acoustic velocity than steel.

For operation of the transducer immersed in water, it is necessary to consider the effect of water loading on the operating frequency. If, as in FIGS. 1 and 2, the transducer is mounted so that only the outer surface 13 is water loaded, all the other surfaces being pressure released, then the water loading will have a reactive component, and a resistive component. The resistive component will result in the radiation of power. The reactive component will add to the effective mass of the transducer shell, resulting in a lowering of the resonant frequency. This factor must be taken into account in order to achieve operation at a desired frequency of radial resonance.

The Q-factor of a thin-walled radially resonant cylinder (shell 10) is given by the equation:

$$Q = \frac{t E_e}{a^2 \omega \rho c \theta_0} \quad \text{(Relation 3)}$$

where:

$t$ is the shell thickness,
$E_e$ is defined in Relation 2,
$a$ is the mean radius (½D) of the shell,
$\omega = 2\pi f$ ("$f$" being the operating frequency in cycles per second),
$\rho c$ is the characteristic acoustic impedance of the medium surrounding the shell (e.g., water), and
$\theta_0$ is the resistive component of the acoustic impedance ratio for the axially symmetrical mode of a cylinder.

$Q$ is thus seen to be proportional to $t$. It is also a function of $D_0/\lambda$, where:

$D_0$ is the outside diameter of the shell, and
$\lambda$ is the wavelength of sound at the operating frequency in the fluid medium surrounding the shell.

The resistive radiation impedance of the resonator cylinder is $S \rho c \theta_0$, where: $S$ is the area of the radiating cylinder surface, namely $\pi D_0 L$, ("L" being the axial length of the cylinder). Since "$\rho c$" is in the denominator of Relation 3, water loading of the transducer will decrease the Q of the resonator. The design of the present invention, because it affords a means to vary the loading factor in the shell structure itself, also permits adjustment of the value of the Q-factor independently of $D_0/\lambda$, of $\rho c$ and of $t$. Thus for a given frequency and "Q," and a given medium (i.e., a given "$\rho c$"), the diameter D may be chosen independently, and then the shell thickness $t$ and the loading factor may be adjusted to yield the desired performance characteristics.

We are aware of the mass-loading technique for cylindrical shells which is disclosed in Patent No. 2,775,749. This patent uses a small number of narrow radial protuberances, and, as the specification states in column 2, lines 32 to 35, this results in the introduction of bending vibration into the shell. This introduces the likelihood of fatigue failure at high power operation levels. In the present invention, no bending vibration is introduced into the shell 10. To the contrary, we employ the maximum amount possible of the loading material, reducing to a minimum the amount of active electromechanical transducer material, as is mentioned above. To this end, the present invention brings the loading material out to the surface 13, in the form of the stem 11.1, providing a structure in which approximately one-third (for example) of the outer shell itself is made of the loading material. The present invention also employs a maximum amount of loading material in an "inner" ring comprised of the cross portions 11.2, thereby minimizing any tendency to produce flexure of the outer shell 10. Since the entire mean circumferences of the shell 10 is one wavelength of sound energy circumferentially in the shell at the fundamental frequency of radial resonance, the employment in the present invention of mass-loading staves which pass entirely through the shell provides that the ceramic struts 10.1 and 10.2 have circumferential dimensions which are small compared to this wavelength, thus practically eliminating any possibility of establishing transverse mode vibrations in the shell. The mass-loading elements of the present invention are the cross portions 11.2 of the T-shaped metal staves 11, and as shown in FIG. 1, these extend substantial distances transversely to the stem portions. This introduces the possibility of operation at a frequency which approaches the transverse resonance frequency of the cross portions 11.2, thereby contributing resonance amplification of the mass-loading, as described and claimed in copending application U.S. Serial No. 842,384 filed September 25, 1959, for "Low Frequency Resonant Transducer," by Miguel C. Junger one of the present inventors. Further, by making possible the use of smaller diameter cylindrical resonators at a given low operating frequency of radial resonance, the present invention takes advantage of the fact that a small cylinder has greater resistance to collapse under hydrostatic pressure than a larger cylinder, other conditions being equal, and can therefore be used in deeper water.

Figure 3:
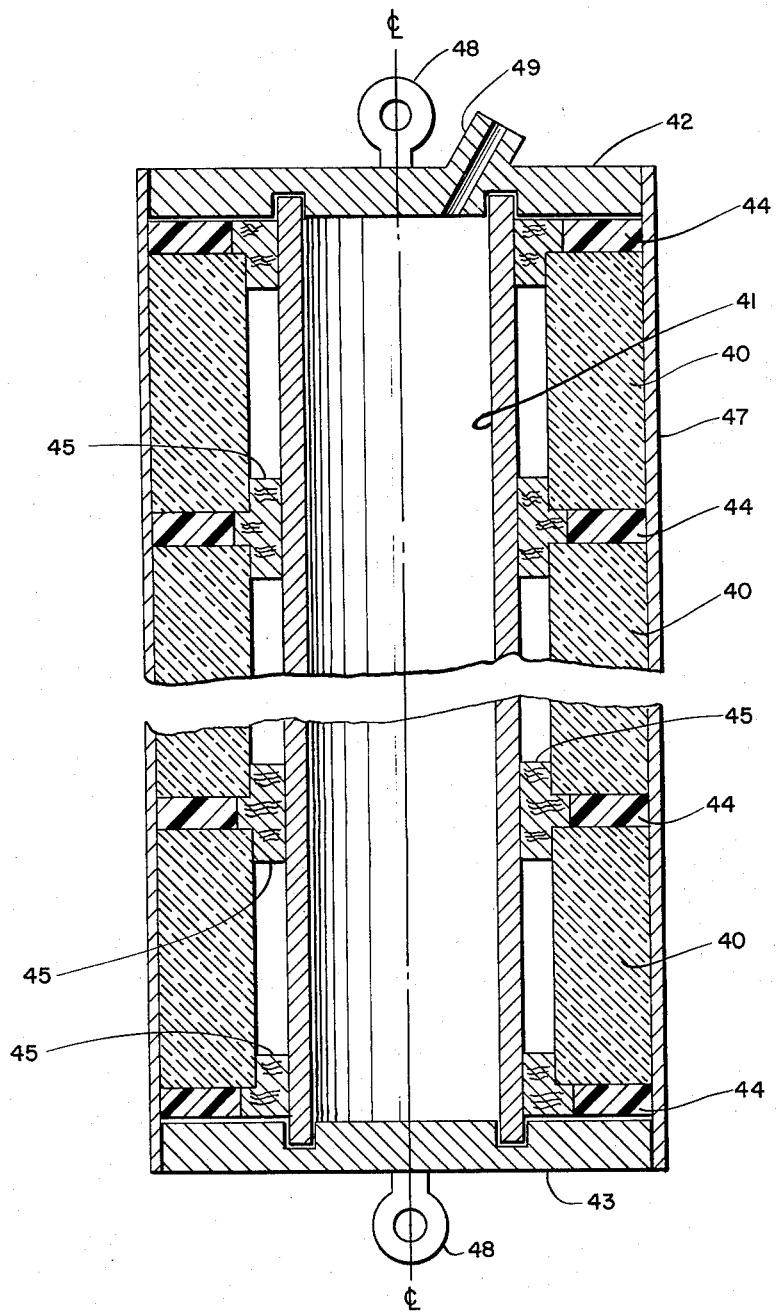
FIG. 3 is a vertical section of another embodiment of the invention.

FIG. 3 shows a transducer array comprising a plurality of radially resonant shell vibrator structures 40 corresponding to the shell structure 10 of FIG. 1, mounted on a common support tube 41 having end caps 42 and 43, corresponding, respectively, to the tube 21 and end caps 22 and 23 of FIG. 1. Nylon or other resilient washers 44 separate adjacent vibrator structures 40 from each other and from the end caps, and pressure release rings 45, made for example of "Corprene," space the vibrator structures from the tube 41. Bolts corresponding to bolts 24 in FIG. 1 are omitted from FIG. 3 for clarity of illustration but it should be understood that such bolts or other suitable fastening means are present in a practical realization of this embodiment of the invention. A stuffing tube 49, corresponding to the stuffing tube 29 in FIG. 2 is provided in one of end caps 42 for the passage of a signal cable (not shown). A sheath 47, here shown as metallic (e.g., a thin shell of stainless steel) is provided in intimate contact with the resonators 40 and cemented or otherwise fastened (e.g., by welding) to the peripheral edges of the end caps 42 and 43. Obviously, any of the sheathing techniques described in connection with FIG. 1 can be employed in the embodiment of FIG. 3. Pad-eyes 48 are provided on one or both end caps as a convenience in handling the assembled transducer.

While no electrical connections have been shown in FIG. 3, it will be understood that each resonator will have such connections, conveniently terminating in two busses like busses 16 and 18 of FIG. 1. The busses of the respective resonators can be driven in the same phase, or in relatively different phases, depending on the directivity desired in a plane including the cylinder axis of the transducer. It is noted also that, if the metal staves are all connected to a common ground, then only one bus (the + bus) is required for each resonator assembly 40.

The embodiments of the invention which have been illustrated and described herein are but a few illustrations of the invention. Other embodiments and modifications will occur to those skilled in the art. No attempt has been made to illustrate all possible embodiments of the invention, but rather only to illustrate its principles and the best manner presently known to practice it. Therefore, while certain specific embodiments have been described as illustrative of the invention, such other forms as would occur to one skilled in this art on a reading of the foregoing specification are also within the spirit and scope of the invention, and it is intended that this invention includes all modifications and equivalents which fall within the scope of the appended claims.

What is claimed is:

1. A hollow cylindrical electromechanical transducer comprising a first plurality of staves of electromechanical transducer material circumferentially arrayed about the cylinder axis of said transducer, a second plurality of staves of substantially rigid electromechanically passive material circumferentially arrayed about said axis, staves of said second plurality alternating with staves of said first plurality, all of said staves terminating in a common outer cylinder surface, electrical connections to said staves of electromechanical transducer material, and mass-loading members each formed as part of a corresponding one of said staves of said second plurality and disposed in the interior of said transducer.

2. In a hollow cylindrical electromechanical transducer intended to vibrate in its radial mode and comprising a first plurality of staves of electroded transducer material circumferentially arranged about the cylindrical axis of said transducer, and a second plurality of staves in alternation with said first plurality, the improvement comprising each stave of said second plurality being of a substantially rigid, electromechanically passive material formed as an elongated element of substantially T-shaped cross-section and having its stem portion disposed between and mechanically coupled with two of the staves of said first plurality.

3. In a hollow, cylindrical, electromechanical transducer intended to vibrate in its radial mode and comprising a first plurality of staves of electroded transducer material circumferentially arranged about the cylindrical axis of said transducer, and a second plurality of staves in alternation with said first plurality, the improvement comprising each stave of said second plurality being of a substantially rigid, electromechanically passive material formed as an elongated element of substantially T-shaped cross-section, having its stem portion disposed between and mechanically coupled with two of the staves of said first plurality, and having its cross portion disposed within the interior of said hollow transducer.

4. In a hollow, cylindrical, electromechanical transducer intended to vibrate in its radial mode and comprising a first plurality of staves of electroded transducer material circumferentially arranged about the cylindrical axis of said transducer, and a second plurality of staves in alternation with said first plurality, the improvement comprising each stave of said second plurality being of a substantially rigid, electromechanically passive material formed as an elongated element of substantially T-shaped cross-section, having its stem portion disposed between and mechanically coupled with two of the staves of said first plurality, and having its cross portion disposed within the interior of said hollow transducer, and electrical connector means, said stem portion being so coupled to said electrical connector means as to serve as an electrode for the said two staves of said first plurality between which each said stem portion is disposed.

References Cited in the file of this patent

UNITED STATES PATENTS

| | | |
|---|---|---|
| 2,419,197 | Benioff | Apr. 22, 1947 |
| 2,515,154 | Lanphier | July 11, 1950 |
| 2,774,892 | Camp | Dec. 18, 1956 |
| 2,775,749 | Sussman | Dec. 25, 1956 |
| 2,838,850 | Stephenson | June 17, 1958 |
| 2,868,311 | Tullos | Jan. 13, 1959 |
| 3,043,967 | Clearwaters | July 10, 1962 |

OTHER REFERENCES

Rand et al.: "The Electro-Acoustic Transducer and Its Application to Sonar Systems"; Proceedings of The National Electronics Conference 1958; vol. 14; published March 27, 1959; pp. 178–194; pp. 179-183 relied on.